July 18, 1961

W. D. JOHNSTON ET AL 2,993,011

PROCESS FOR PRODUCING LITHIUM SUBSTITUTED
TRANSITION METAL OXIDES AND
MEMBERS PREPARED THEREFROM

Filed April 26, 1956

WITNESSES
Edwin E. Bassler
Leon M. Garman

INVENTORS
William D. Johnston
& Robert R. Heikes
BY
Frederick Shapoe
ATTORNEY 2,993,011
PROCESS FOR PRODUCING LITHIUM SUBSTI-
TUTED TRANSITION METAL OXIDES AND
MEMBERS PREPARED THEREFROM
William D. Johnston, East McKeesport, and Robert R.
Heikes, Pittsburgh, Pa., assignors to Westinghouse
Electric Corporation, East Pittsburgh, Pa., a corpora-
tion of Pennsylvania
Filed Apr. 26, 1956, Ser. No. 580,856
4 Claims. 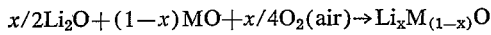

This invention relates to a novel process for producing certain lithium substituted transition metal oxides and thermally sensitive members therefrom.

It has been proposed heretofore to prepare lithium substituted metal oxides by sintering a mixture of lithium oxide ($Li_2O$) and a divalent transition metal oxide such, for example, as nickel oxide at a high temperature in air. For producing the desired reaction product, oxygen must be supplied by the surrounding atmosphere as indicated by the following equation:

$$x/2Li_2O + (1-x)MO + x/4O_2(air) \rightarrow Li_xM_{(1-x)}O$$

M in this equation represents nickel or cobalt. There are a number of disadvantages associated with air oxidation in such processes. Thus, manganous oxide cannot be heated in air, inasmuch as higher oxides of manganese will be formed and the desired reaction product will not result. In addition, the diffusion of the atmospheric oxygen into a compact of the lithium oxide and the transition metal oxide takes prolonged periods of time. Furthermore, the complete and thorough oxidation of the entire compact, particularly with larger size compacts, is difficult if not impossible to obtain with larger and larger compacts.

It has been discovered that lithium substituted transition metal oxides may be prepared with highly satisfactory and uniform results if lithium peroxide ($Li_2O_2$) is employed in a process as will be set forth hereinafter. A considerable number of lithium substituted transition metal oxides may be satisfactorily and rapidly prepared in accordance with this process.

These lithium transition element oxide members may be employed as resistors, thermistors, infra-red detectors, components of electrical compensating circuits and the like.

An object of the present invention is to provide a process for reacting lithium peroxide and certain transition metal oxides, whereby to produce a specific desired single phase reaction product having predetermined electrical resistivity-temperature characteristics.

Another object of the invention is to provide for preparing lithium-manganese metal oxides having predetermined resistivity.

A still further object of the invention is to provide a reaction product comprising lithium and two or more transition metal oxides, such product having predetermined resistivity at room temperature and a selected change in electrical resistance with temperature.

Other objects of the invention will, in part, be obvious and will, in part, appear hereinafter. For a better understanding of the nature and objects of the invention, reference should be had to the following detailed drawing and description, in which.

Figure 1:
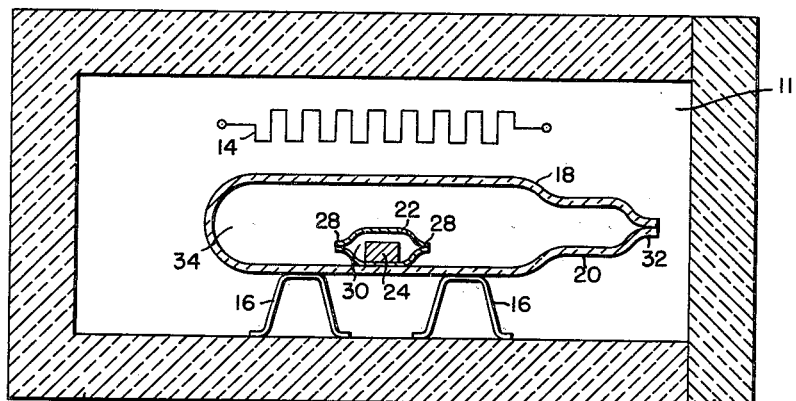
FIGURE 1 is a vertical cross section through a furnace showing the preparation of the reaction products of the present invention.

It has been discovered in accordance with the present invention that lithium substituted transition metal oxide reaction products having a high degree of uniformity and predetermined composition may be rapidly and successfully prepared by employing lithium peroxide and one or more divalent metal oxides of the group of metals comprising chromium, manganese, iron, nickel, cobalt and copper. Ordinarily, the lithium does not comprise in excess of 35 atom percent of the reaction product. As little as $1/100$ of one atom percent of the reaction product may comprise lithium, the balance of the metal being one or more of the transition metals.

Briefly, the process comprises admixing predetermined proportions of lithium peroxide and the desired divalent transition metal oxide or a plurality of the latter metal oxides. The intimate admixture is compressed under a high pressure to form a compact or pellet of desired shape and size. The resulting pellet is placed within a small sealed container of a non-reactive material such, for example, as platinum or tantalum. The container is sealed to restrict or even prevent the escape of gases therefrom. This container with its pellet is then heated to a temperature of from 600° C. to 1200° C. for a sufficient period of time to cause a single phase lithium substituted transition metal oxide to be produced. The lithium peroxide supplies the oxygen necessary for the reaction product in accordance with the following equation:

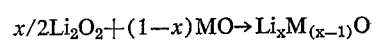

The container with the sintered compact is quenched by plunging it into water and when opened there will be obtained a sintered compact of the reaction product.

Lithium peroxide may be readily prepared by reacting lithium hydroxide with hydrogen peroxide in an aqueous solution. Water may be removed from the product by adding n-propanol and distilling the mixture. Anhydrous lithium peroxide will be obtained as the residue in the distillation apparatus. Lithium peroxide so made contains between 34% and 35% of active oxygen with the balance being lithium monoxide.

The divalent transition metal oxides are available or may be readily prepared. Thus, pure manganous oxide is prepared by dissolving electrolytic manganese in concentrated nitric acid, and the resultant solution is decomposed by heating to produce manganese dioxide ($MnO_2$). The manganese dioxide may be reduced with dry hydrogen at 900° C. to form the manganous oxide (MnO).

The following example is illustrative of the preparation of the reaction products of the present invention.

EXAMPLE I

Lithium peroxide in an amout to provide 0.1 mol of lithium was admixed with sufficient manganous oxide to provide 0.9 mol of manganese. The mixture was ground in a mullite mortar under an atmosphere of nitrogen for a period of time until an intimate admixture had been produced. Other protective inert gases such as argon may be employed. The finely ground and admixed powder mixture was placed in a steel die having an opening of ¼ inch in diameter and compressed to a pressure of 50,000 pounds per square inch without allowing the ground powder to come in contact with the atmosphere. The resulting pellet of a length of approximately ¼ inch was placed within a thin walled tube of platinum having one end crimped at a high pressure so that a substantially hermetic joint had been produced. After the pellet was introduced, the other end of the tube of platinum was similarly crimped under high pressure to provide a sealed container. The volume of the space within the platinum tube was approximately triple the volume of the pellet. The less free volume the better the results will be. It will be understood that numerous other form of enclosures or containers for one or more compacts or pellets may be prepared. In some instances a number of fine platinum wires were placed on the bottom of the container and the pellets rested on such wires so as to minimize the contact area between the pellet and the container.

Referring to FIG. 1 of the drawing, there is illustrated a furnace in which the sealed pellet produced as described in this example was disposed. The furnace comprises a thermally insulating and refractory casing 10 provided with a movable door 12. Within a chamber 11 formed by the casing 10 and door 12 is disposed a heating element 14 capable of being energized by electrical current. A number of refractory supports 16 are exposed within the chamber 11. Upon the supports 16 is placed a refractory enclosure 18 comprising a suitable neck opening 20 through which a sealed container 22 of platinum, tantalum or other inert metal may be introduced, the container 22 holding the compacted pellet 24 of the lithium peroxide and divalent transition metal oxide. Ends 28 of the containers are substantially hermetically sealed by crimping or the like. Space 30 within the container is of relatively limited volume, not exceeding the volume of the pellet 24 by any great extent. After the container 22 has been introduced into the enclosure 18, the end 32 of neck opening 20 is sealed. The enclosure 18 may comprise a high silica glass or other refractory material. The internal space 34 within the enclosure 18 is preferably filled with an inert gas such as argon which when cold ordinarily may be at a pressure below atmospheric. Good results have been obtained when ⅓ of an atmosphere of argon has been introduced into the space 34 and then a seal at end 32 effected by fusion.

The heating element 14 is energized to heat the contents of the furnace at a suitable rate. No particular rate of temperature rise is necessary. However, it has been found that good results are obtained if the rate of heating is such that the pellets in the furnace reach a temperature of 300° C. in two hours and are slowly heated to and held at 450° C. over the next two hours, and finally the temperature again raised over an hour and held for 20 hours at a temperature of 900° C. At the end of this last 20-hour period, the enclosure 18 and the container 22 with the reacted compact therein are withdrawn from the furnace and immersed in water in order to quench the reaction product and prevent conversion of the single phase reaction product into two phases, which would take place in some cases if the cooling was protracted. The quenched single phase reaction products are stable up to relatively high temperatures of 400° C. and higher, depending on the composition.

Temperatures of from 600° to 1200° C. may be employed in causing the reaction of the lithium peroxide and the divalent transition metal oxide. At 600° C. the reaction time will be quite long, approaching hundreds of hours. At 1200° C. the reaction is quite rapid and may require only a period of time of the order of one hour.

It will be understood that the specific furnace and enclosure apparatus shown in FIG. 1 is not necessary. Thus, a plurality of pellets may be sealed within a single refractory metallic capsule 22 and the entire assembly placed within a conventional furnace. The employment of the protective enclosure 18 is out of an abundance of precaution to prevent degradation of the reaction product. It is only necessary that the pellets 24 be disposed in a relatively confined chamber so that escape of oxygen gas from the solid lithium peroxide be kept to a minimum. Any oxygen that so escapes will reduce the effectiveness of the process.

The sintered and quenched reaction product members of the present invention are usually black in color. Their hardness varies progressively with the position of the transition metal in the periodic table, being hardest for the lithium manganese oxide product and weakest with the lithium copper oxide product. An extremely hard and durable member comprises the lithium manganese oxide sintered compacts, lithium cobalt oxide compacts are slightly less hard and the lithium nickel compacts are weaker while the lithium copper oxide compacts are weakest and must be handled with slightly more care than the other. Thus, the lithium manganese oxide compacts can be dropped upon a steel plate from a distance of several feet or even thrown at a concrete floor without being appreciably harmed.

The sintered compacts of the present invention may be ground or machined to size and then made into thermally sensitive electrical resistance elements by applying electrical leads to the ends of the sized pellets and measuring the resistivity of the pellet.

Figure 2:
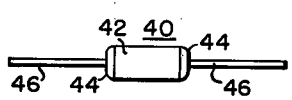
FIG. 2 is a view in elevation of a resistance element produced in accordance with the present invention.

Referring to FIG. 2 of the drawings, there is illustrated one form of resistance element that may be produced in accordance with the invention. The resistance element 40 comprises a sintered and quenched compact 42 of suitable size and shape, as produced in accordance with Example I for instance. A layer of solder or brazing alloy 44 is applied to each end of the pellet 42. Ordinarily, the end of the pellet may be coated by vacuum deposition with platinum, silver or other solderable or adherent layer of metal. A platinum or silver base paint may be applied and fused to provide a conductive contact. A tin base solder or brazing alloy 44 may be then applied to the coated surfaces to retain the ends of conductor leads 46.

A number of lithium substituted divalent manganese oxide products were prepared. The proportions of the components in the mixed powder and the resultant composition of the sintered compacts have been determined by chemical analysis. Also, the densities of the pressed compact have been determined and compared with the density of the final sintered compact. These data are shown in the following table.

*Table I*

| Original Composition | Final Composition | Apparent Pressed Density | Apparent Sintered Density |
|---|---|---|---|
| $Li_{0.05}Mn_{0.95}O$ | $Li_{0.046}Mn_{0.954}O$ | 4.34 | 4.32 |
| $Li_{0.10}Mn_{0.90}O$ | $Li_{0.094}Mn_{0.906}O$ | 4.25 | 3.96 |
| $Li_{0.15}Mn_{0.85}O$ | $Li_{0.143}Mn_{0.857}O$ | 4.08 | 3.77 |
| $Li_{0.20}Mn_{0.80}O$ | $Li_{0.195}Mn_{0.805}O$ | 4.00 | 3.58 |
| $Li_{0.25}Mn_{0.75}O$ | $Li_{0.247}Mn_{0.753}O$ | 3.83 | 3.40 |
| $Li_{0.30}Mn_{0.70}O$ | $Li_{0.296}Mn_{0.704}O$ | 3.84 | 3.30 |
| $Li_{0.35}Mn_{0.65}O$ | $Li_{0.347}Mn_{0.653}O$ | 3.62 | 2.89 |
| $Li_{0.40}Mn_{0.60}O$ | $Li_{0.397}Mn_{0.603}O$ | 3.69 | 2.94 |

Figure 3:
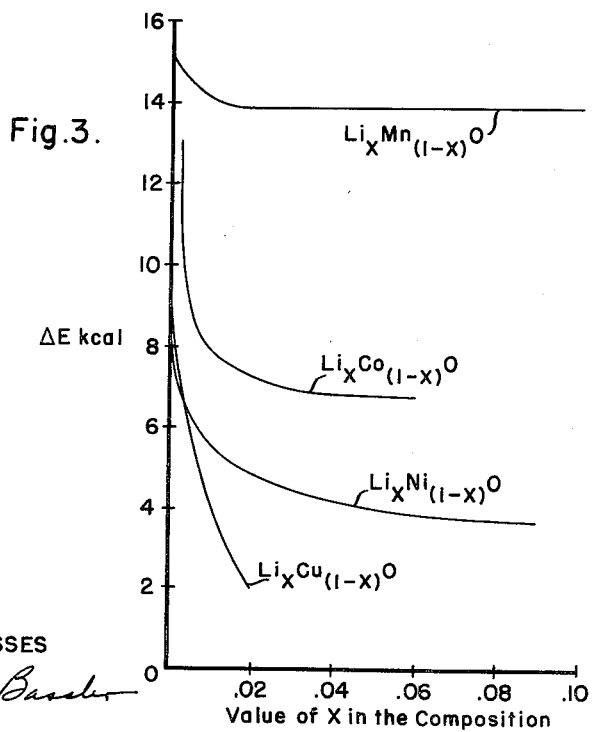
FIG. 3 is a graph wherein the activating energy for conductivity is plotted against composition for four different reaction products over a range of proportions of the present invention.

The resistivity of a number of compositions has been measured as a function of temperature. The resistance of the compositions is represented by the equation $$P = P_0 e^{Q/T}$$

where $P_0$ is the resistivity at infinite temperature, Q is the activation energy E divided by the gas constant and P is the resistivity at an absolute temperature T. Q equals $\Delta E/R$, where R is the gas constant. The change in $\Delta E$ in kilocalories with change in composition has been plotted for a number of the reaction products of the present invention. Curves prepared from such compositions are shown in FIG. 3 of the drawings. It will be noted that the $\Delta E$ becomes relatively constant for the lithium manganese oxide reaction products where $x$ is 0.02 and higher. It has been found that there are regions in these reaction product systems over which the activation energy is relatively constant. The insensitivity of $\Delta E$ to lithium content is a highly desirable characteristic of the present compositions in preparing members, inasmuch as slight changes in proportions which would be normally expected in producing the lithium divalent metal oxide products, will effect substantially no change in the activation energy.

Figure 4:
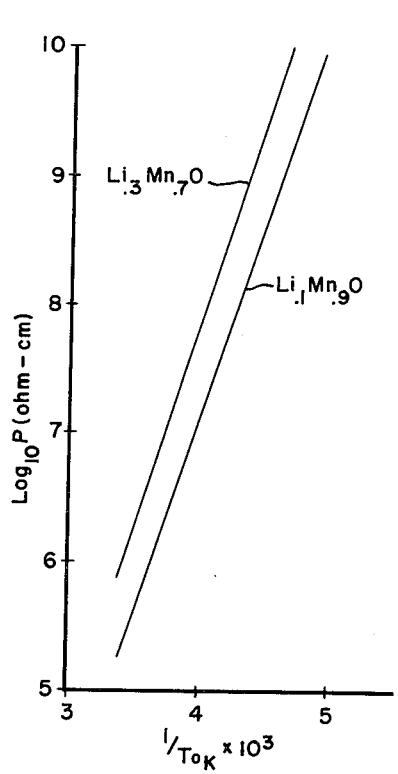
FIG. 4 is a graph plotting the logarithm of resistivity against the reciprocal of the absolute temperature for two different lithium manganese oxide reaction products.

In order to illustrate the regular change in resistivity with changes in temperature for specific reaction products of this invention, reference should be had to the curves in FIG. 4 of the drawing. The curves have been plotted from tests made on two lithium manganese oxide reaction products; namely, those in which lithium comprises 0.1 mol percent and 0.3 mol percent. The logarithm of the resistivities has been plotted against the reciprocal of the absolute temperature. It will be noted that both curves are straight and substantially parallel. Consequently, the reaction products need not be calibrated for temperature-resistance properties except at a single point. Such resistance members need be calibrated at one temperature solely to account for their shape or geometrical configuration rather than to consider the variations in composition.

Figure 5:
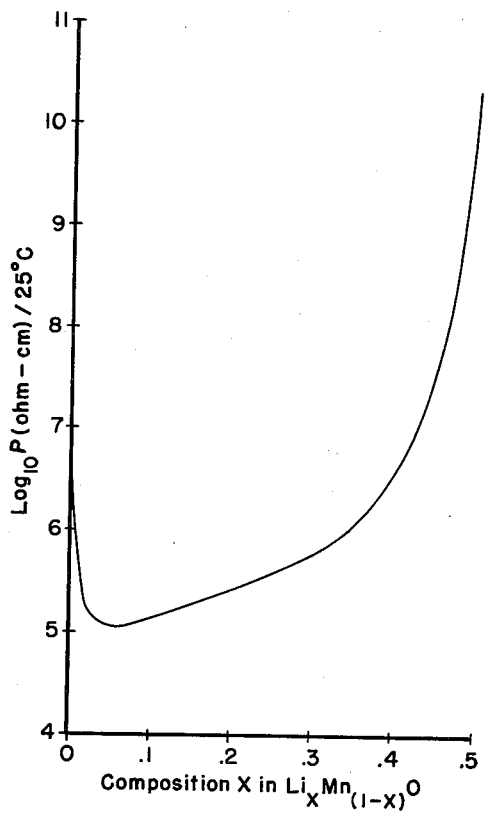
FIG. 5 is a curve plotting the logarithm of resistivity against composition of a range of lithium manganese oxides at 25° C.

Another series of tests was made on a plurality of sintered lithium manganese oxide reaction product members of varying composition by measuring their resistivity at 25° C. These results are plotted in the curve of FIG. 5 of the drawings. It will be noted that for these compositions, the resistivity at 25° C. varies but slightly for values of $x$ of from approximately 0.05 to 0.3, increasing regularly with increased lithium contact. While the curve shows tests on compositions where $x$ exceeds 0.35, the reaction products beyond these values of $x$ are two phase products and are not satisfactory for thermistor applications.

A particularly important feature of the present invention is the preparation of resistance members having a predetermined resistivity. Such compounds may be produced by admixing two or more divalent transition metal oxides with a given amount of lithium peroxide and sintering the mixture as described herein. Thus, if it is desirable to have a sintered member of a given shape and size having a specific resistivity at 25° C., for example, there need only be admixed selected divalent metal oxides in specified proportions. The resistivity of the compositions comprising only a single divalent metal are progressively smaller when going from left to right in the periodic table. Thus, the lithium manganese oxide reaction product has a higher resistivity than the lithium cobalt oxide, while the lithium nickel oxide has a resistivity smaller than the cobalt. Particularly suitable reaction products are those comprising a mixture of two divalent metal oxides and the lithium peroxide. The sintered products will have a formula $Li_xM_{(1-x-y)}M_y'O$. The resistivity of the mixture is proportional to the summation of the product of the mol fraction and resistivity of each component. Accordingly, resistance members may be prepared having a resistivity at room temperature from as low as 1 ohm centimeter to as high as $10^{12}$ ohm centimeters.

An example of suitable reaction products containing a plurality of divalent metals is the following:

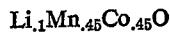

This reaction product may be prepared by reacting 0.1 mol of lithium peroxide and 0.9 mol of the compound $Mn_{.5}Co_{.5}O$, the latter may be prepared as set forth by Bacon et al. in Proceedings of the Royal Society 217A, 252(53). This mixture may be finely divided and admixed into an intimate powder in accordance with the procedure of FIG. 1 which may be followed to produce the sintered compact.

It will be understood that the above description and drawings are exemplary and not limiting.

We claim as our invention:

1. In the process of producing a reaction product having predetermined resistivity, the steps comprising admixing lithium peroxide and at least one divalent oxide of a metal selected from the group consisting of chromium, manganese, iron, nickel, cobalt and copper, in proportions of up to 35 atom percent of lithium and less than 65 atom percent of the metal, placing the admixture in a sealed container of a volume only moderately larger than the volume of the mixture, heating the mixture in said sealed container to a temperature of from 600° C. to 1200° C. for a period of time to produce a single phase reaction product, and quenching the reaction product, the product having the formula $Li_xM_{(1-x)}O$ where $x$ has a value of up to 0.35, and M represents at least one metal of the group consisting of chromium, iron, nickel, cobalt, copper and manganese.

2. In the process of producing a reaction product having predetermined resistivity, the steps comprising heating to a temperature of from 600° C. to 1200° C., a pellet comprising a compressed mixture of lithium peroxide and at least one divalent metal oxide having the formula MO, where M represents a metal selected from the group consisting of chromium, iron, manganese, cobalt, nickel, and copper, the pellet being maintained in a confined space during the heating whereby oxygen is retained in the space, the heating being continued until conversion is effected of substantially all the mixture to a single phase reaction product having the formula $$Li_xM_{(1-x)}O$$

where $x$ has a value of up to 0.35, and quenching the product to retain the single phase structure.

3. The process of claim 2, wherein at least two divalent metal oxides are admixed with the lithium peroxide.

4. A thermally sensitive member whose electrical resistance varies uniformly with temperature, comprising a sintered compact having the formula $Li_xMn_{(1-x)}O$ where $x$ has a value of from 0.0001 to 0.35.

References Cited in the file of this patent

UNITED STATES PATENTS

| | | |
|---|---|---|
| 2,487,119 | Fenton | Nov. 8, 1949 |
| 2,515,931 | Six et al. | July 18, 1950 |
| 2,549,089 | Hegyi | Apr. 17, 1951 |

FOREIGN PATENTS

| | | |
|---|---|---|
| 504,598 | Belgium | Jan. 11, 1952 |

OTHER REFERENCES

Dyer et al.: Journal of American Chemical Society, vol. 76, No. 6, March 20, 1954, pp. 1499–1500.

Verwey et al.: Philips Research Report, vol. 5, 1950, pp. 173–187.

Thorpe's Dictionary of Applied Chemistry, 4th ed., vol. VII, 1946.